INVENTOR.
WALTER KIDD
BY
Barnes, Kisselle, Raisch & Choate
ATTORNEYS

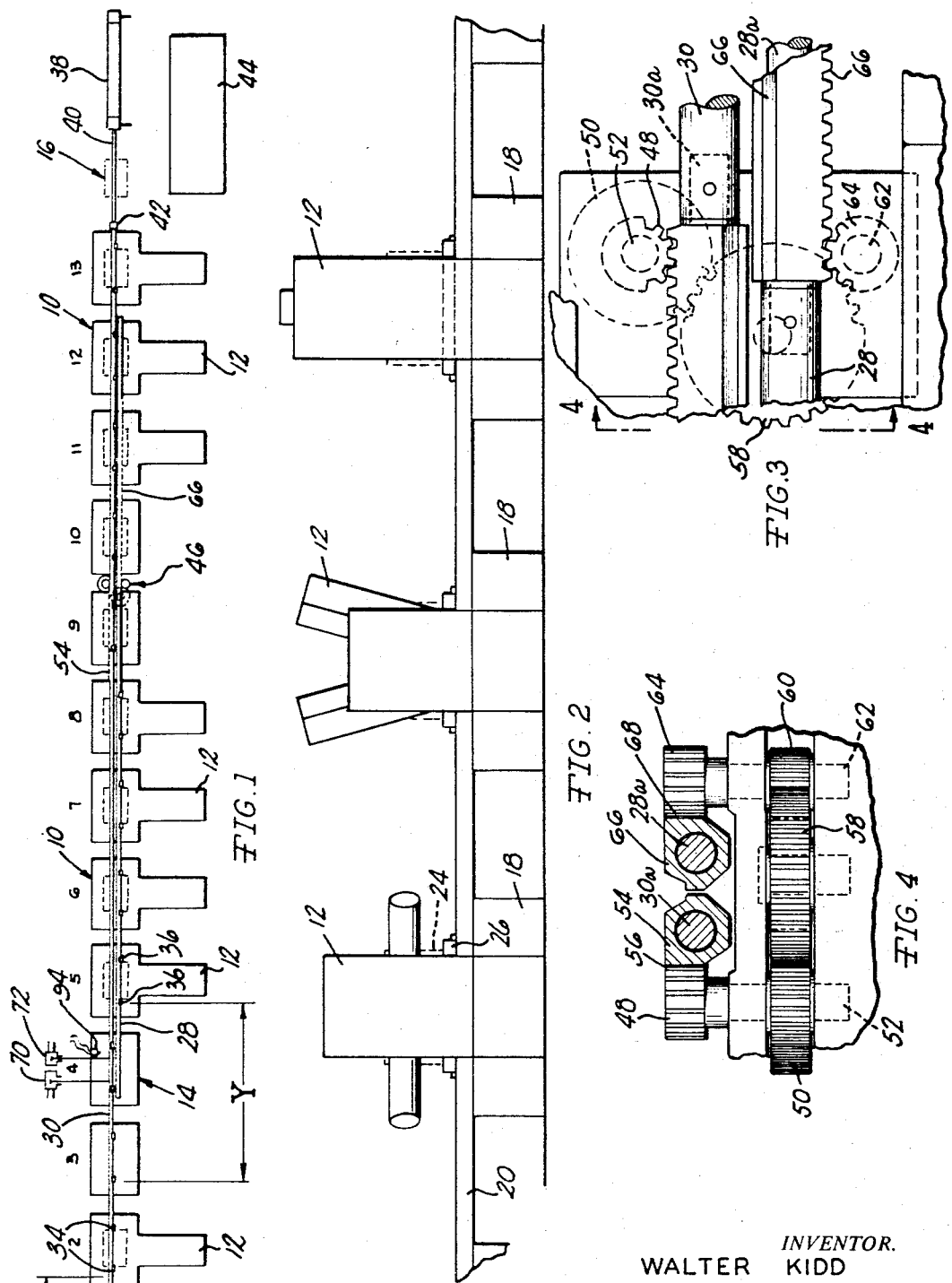

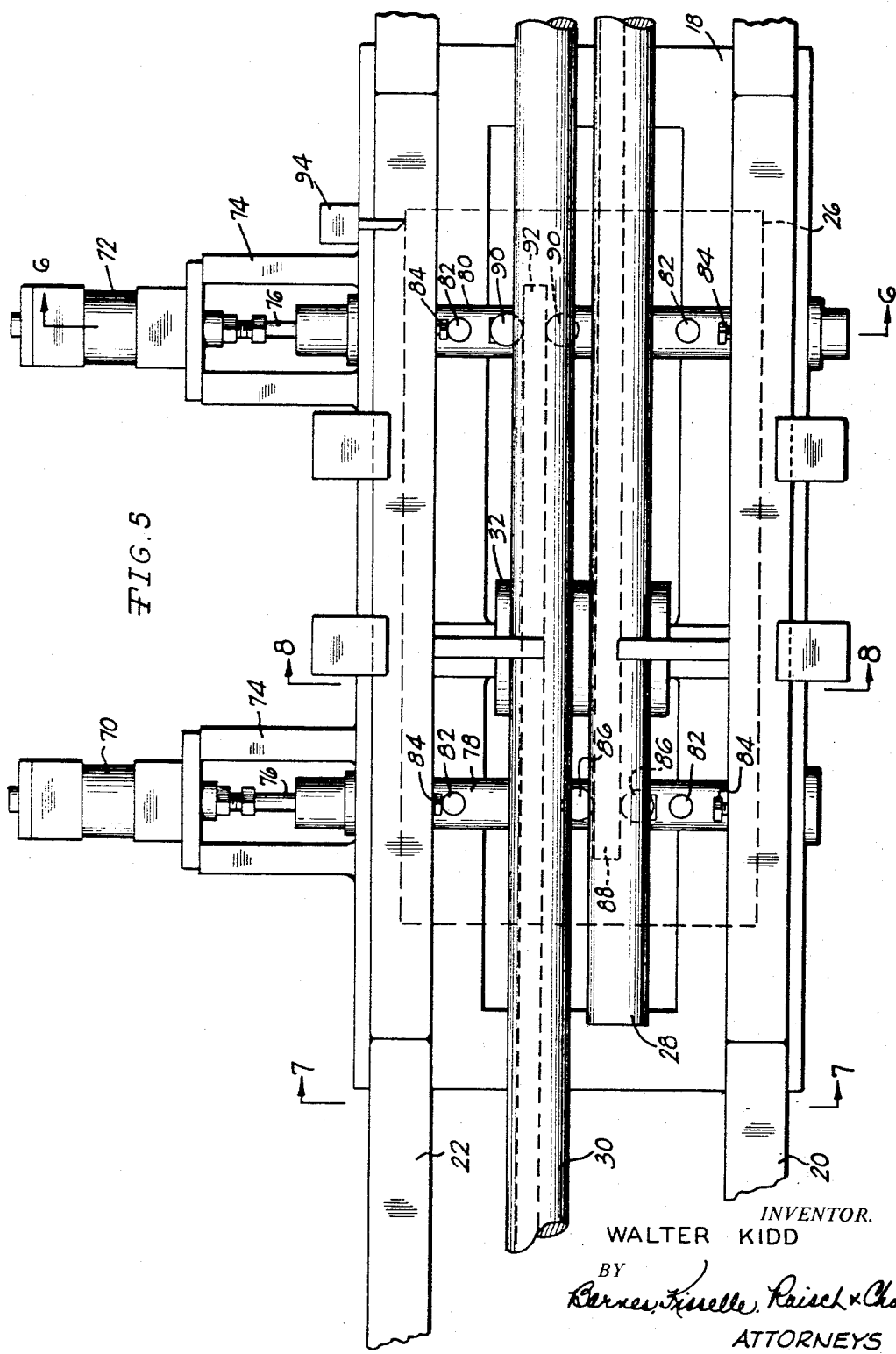

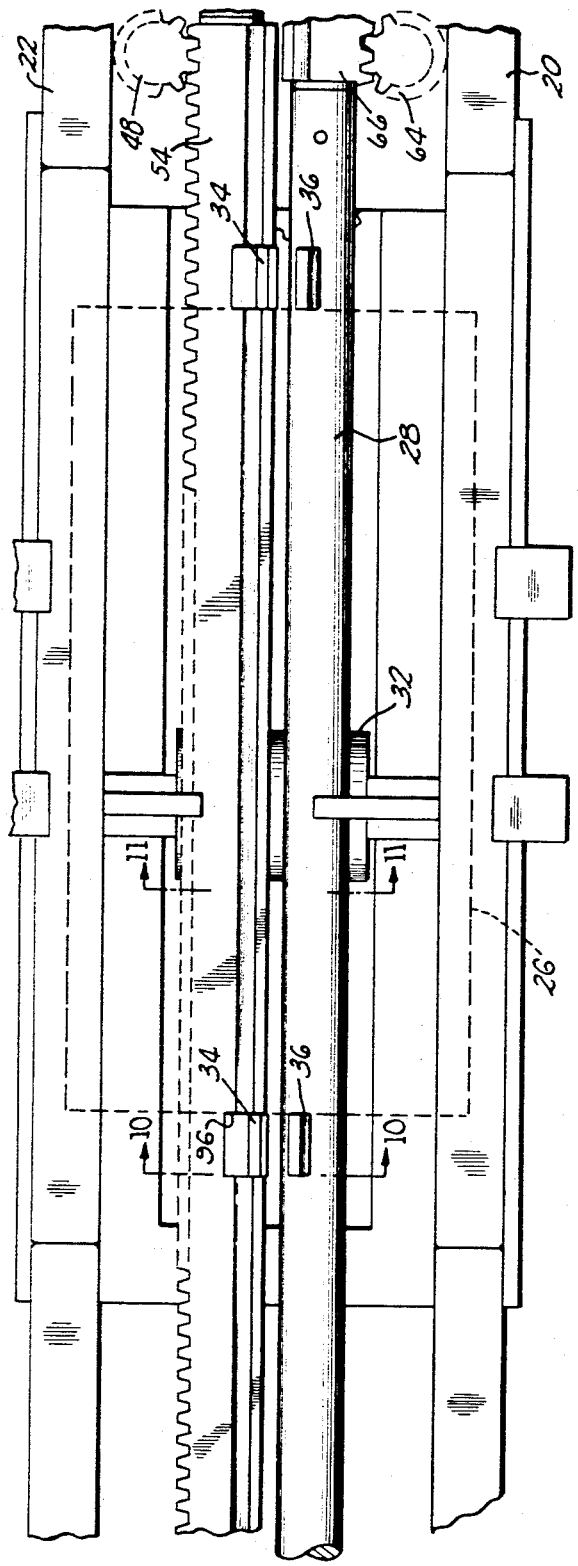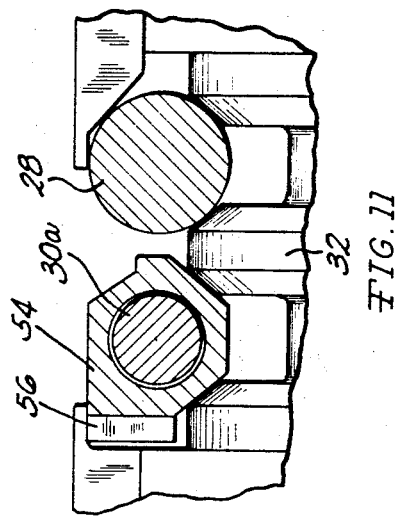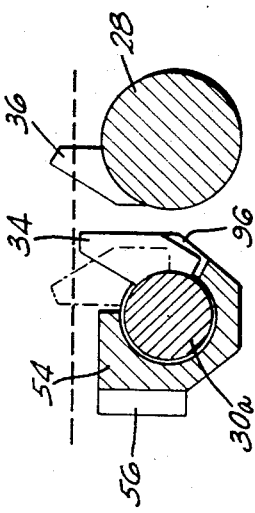

United States Patent Office 3,417,852
Patented Dec. 24, 1968

3,417,852
DUAL BAR TRANSFER DEVICE
Walter L. Kidd, Warren, Mich., assignor to F. Jos. Lamb Company, Incorporated, Detroit, Mich., a corporation of Michigan
Filed May 29, 1967, Ser. No. 641,866
20 Claims. (Cl. 198—19)

This invention relates to a transfer mechanism and, more particularly, to a conveying means for progressively advancing workpieces through a series of stations at which automated machine tools are located for performing some operation on a workpiece.

It frequently happens that some machining operations in an automated machine tool line require considerably more time for completion than other operations in the same line. Under these circumstances, it is undesirable to delay advancement of all the workpieces from one station to the next until a sufficient time has elapsed to complete the machining operation which requires the longest time interval. Such an arrangement would be inefficient from the standpoint of allowing workpieces to remain at a work station for a considerably longer period of time than is necessary to complete the machining operation at that work station.

The present invention has for its object the provision of an improved transfer mechanism designed such that workpieces located at work stations which require a short time interval to complete the machining operation are moved to the next successive station at a time when other workpieces at work stations are still being subjected to a machining operation which requires substantially more time.

More specifically, the present invention is directed to a transfer mechanism for an automated machine line which incorporates a group of idle stations between a group of work stations on the one hand which require a relatively short time to complete the machining operation and another group of work stations which require a relatively longer period of time to complete the machining operation. With this arrangement two transfer bars are employed for indexing the workpieces through the successive stations. The transfer bars are reciprocated simultaneously in opposite directions and through different strokes such that one transfer bar is actuated after each successive time interval corresponding to the machining operation of lesser duration and the other transfer bar is operated to advance workpieces only after a longer time interval corresponding to that required for the longer machining operation.

In the drawings:

FIGURE 1 is a somewhat schematic view of a transfer mechanism embodying the present invention.

FIGURE 2 is a fragmentary elevational view of the transfer mechanism shown in FIG. 1.

FIGURE 3 is a fragmentary plan view of a portion of the transfer mechanism illustrated in FIG. 1 at the location of the drive arrangement for the two transfer bars.

FIGURE 4 is a sectional view along the line 4—4 in FIG. 3.

FIGURE 5 is a fragmentary plane view of the transfer mechanism at the location designated station 4 in FIG. 1.

FIGURE 9 is a fragmentary plan view of the transfer mechanism generally at the location designated station 9 in FIG. 1.

FIGURE 10 is a sectional view along the line 10—10 in FIG. 9.

FIGURE 11 is a sectional view along the line 11—11 in FIG. 9.

Figure 8:
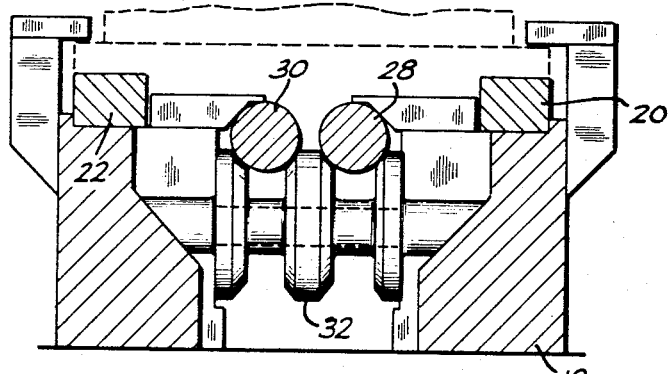
FIGURE 8 is a sectional view along the line 8—8 in FIG. 5.

Referring to FIG. 1, the present invention is illustrated in connection with an automated machine line which includes a plurality of stations 10 at which machine tools 12 are located and a second plurality of stations designated 14 which are idle stations that do not include machine tools. The stations are shown arranged in a straight line and are numbered consecutively as stations 1 through 13. Beyond station 13 there may be located an unload station 16. The load station at the beginning of the line is not specifically illustrated. At each station there is arranged a base 18 which supports a pair of transfer rails 20, 22 (FIG. 5). The workpieces 24 on which machining operations are to be performed are supported on pallets 26 that are arranged for sliding movement on the transfer rails 20, 22. The means for advancing the workpieces between successive stations comprises a pair of transfer bars 28, 30. Transfer bars 28, 30 are supported on bases 18 for reciprocation by a plurality of pairs of support and guide rollers 32 (FIGS. 5 and 8). Referring to FIG. 1, it will be observed that transfer bar 30 extends the full length of stations 1 through 13 while transfer bar 28 extends from approximately station 4 to station 12. In the arrangement illustrated in FIG. 1 transfer bar 30 is in the fully retracted position and transfer bar 28 is in the fully advanced position. In the position illustrated, transfer bar 30 has a pair of dogs 34 located adjacent each of stations 1 through 3 and 9 through 13 for engaging the front and rear edges of a pallet 26 located at such stations. On the other hand, in the position illustrated, transfer bar 28 has dogs 36 which are located at stations 5 through 10. The two idle stations 3 and 4 may be designated cumulating stations, while the two idle stations 9 and 10 may be designated as the separating stations. The significance of these designations will become apparent hereinafter.

In a transfer arrangement as disclosed herein the two transfer bars 28, 30 are adapted to be reciprocated simultaneously in opposite directions. In the arrangement shown in the drawings, the means for reciprocating the transfer bars is illustrated as a hydraulic cylinder 38 in which is slidably arranged a piston (not shown) with a piston rod 40 extending out of one end of cylinder 38 and having a swiveled driving connection with transfer bar 30 as at 42. A control panel 44 includes a suitable control mechanism for actuating cylinder 38 at regular time intervals so that upon each actuation of cylinder 38 transfer bar 30 reciprocates through a complete cycle; that is, it advances through a predetermined distance and then retracts through the same distance so as to position the dogs 34 thereon in the same position at the end of each cycle.

The means for reciprocating transfer bar 28 simultaneously with transfer bar 30 and in the opposite direction are best illustrated in FIGS. 1, 3 and 4 and comprises a gear train generally designated 46 which is located generally between stations 9 and 10. The location of gear train 46 is not critical. Gear train 46 comprises a first pair of gears 48, 50 fixedly mounted on a first shaft 52 journalled in support structure on base 18 for rotation about a vertical axis. Adjacent gear 48 transfer bar 30 has a reduced section 30a on which is journalled a sleeve 54 formed with a rack portion 56 along the outer side thereof which meshes with gear 48. Gear 50 has a diameter substantially greater than gear 48 and meshes with a larger idler 58. Idler gear 58 in turn meshes with a driven gear 60 which is fixed to a shaft 62 that also carries a driven gear 64. Adjacent gear 64 transfer bar 28 has a reduced section 28a on which is journalled a sleeve 66 provided with a rack portion 68 which meshes with gear 64. The rack sleeves 54, 66 are axially fixed on their respective transfer bars and the gear ratio in gear train 46 is two to one so that transfer bar 28 has a stroke exactly twice that of transfer bar 30. The stroke of transfer bar 30 is the distance between successive stations and is designated X. The stroke of transfer bar 28 is the distance between alternate stations and is designated Y. Therefore, since in FIG. 1 transfer bar 30 is shown in the advanced position and transfer bar 28 is shown in the retracted position, in the arrangement illustrated in FIG. 1 rack sleeve 54 extends from gear train 46 rearwardly to approximately station 8 whereas rack sleeve 66 extends from gear train 46 forwardly just beyond station 11.

Figure 6:
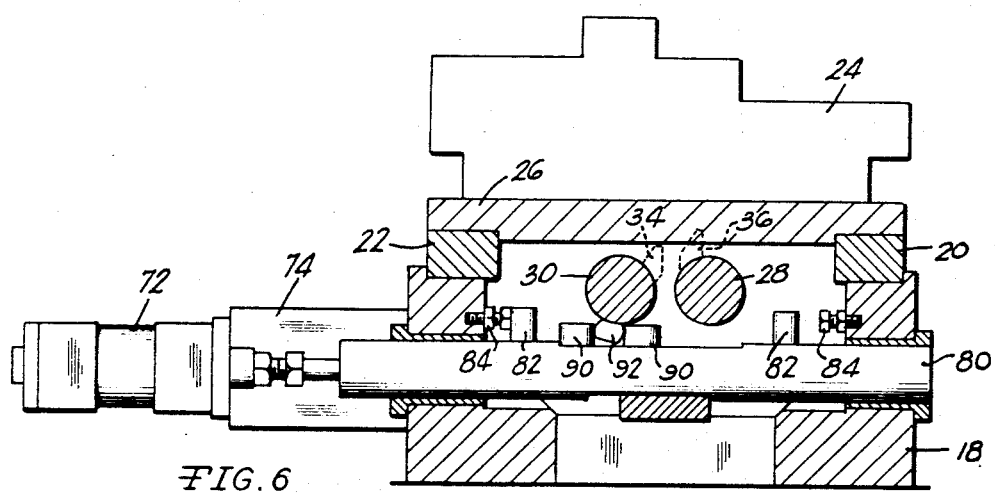
FIGURE 6 is a sectional view along the line 6—6 in FIG. 5.
Figure 7:
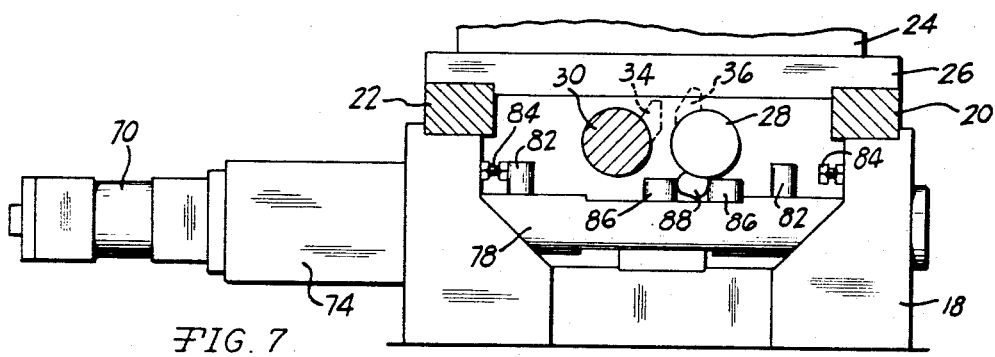
FIGURE 7 is a sectional view along the line 7—7 in FIG. 5.

The two transfer bars are adapted to be rotated slightly about their longitudinal axes to swing the transfer dogs 34, 36 to and from the engaged position. These means are in the form of a pair of hydraulic cylinders 70, 72 which are located adjacent station 4. Referring to FIGS. 5, 6 and 7, cylinders 70, 72 are mounted on support structure on base 18 by means of brackets 74. The cylinders are oriented so that their axes extend horizontally in a direction transversely to the longitudinal axes of transfer bars 28, 30. The piston rod 76 associated with each cylinder is connected with a transversely extending slide; the slide associated with cylinder 70 being designated 78 and the slide associated with cylinder 72 being designated 80. Each slide 78, 80 has studs thereon which are adapted to engage adjustably fixed stops 84 for limiting the stroke of each slide adjacent the opposite ends. Slide 78 has a pair of guide rollers 86 thereon which engage the opposite side faces of a guide bar 88 affixed to the underside of the transfer bar 88. Guide bar 88 has a length slightly greater than the stroke of transfer bar 28. Slide 80 also has a pair of guide rollers 90 thereon which engage the opposite side faces of a guide bar 92 on the underside of transfer bar 30. Guide bar 92 has a length slightly greater than the stroke of transfer bar 30. With this arrangement it will be seen that when cylinders 70, 72 are actuated, guide bars 28, 30 are rotated about their longitudinal axes to swing dogs 34, 36 between the engaged and disengaged position. In FIGS. 5, 6 and 7 dogs 36 are illustrated in broken lines in the engaged position; that is, they are in engagement with the opposite ends of pallets 26 and dogs 34 are in the disengaged position to bypass pallets 26.

Cylinder 72, which controls the rotation of transfer bar 30, is actuated to swing dogs 34 upwardly to the engaged position on each forward stroke of transfer bar 30. On each return stroke of transfer bar 30 cylinder 72 is actuated to pivot dogs 34 to the bypassing or disengaged position. For reasons which will become apparent as the description proceeds, dogs 36 on transfer bar 28 are pivoted upwardly to the engaged position on each alternate stroke of transfer bar 28. One of the control means for producing this is a pallet-present switch 94 located on the base of station 4 and adapted to be actuated by a pallet at station 4. In other words, when a pallet is present at station 4, switch 94 conditions the circuit controlling cylinder 70 so as to actuate cylinder 70 in response to the required signal produced by the control mechanism in control panel 44.

It will be apparent that the two gear racks sleeves 54, 66 are not rotated in response to actuation to cylinders 70, 72; however, each of these sleeves is provided with arcuately extending circumferential slots 96 (FIG. 10) to allow for pivotal movement of the dogs 34, 36 on the respective bars.

The specific arrangement shown illustrates a plurality of machining operations on the workpieces 24 wherein the various machining operations require different lengths of time for completion. For example, the machining operation performed at stations 1, 2, 11, 12 and 13 are all different from one another and require a relatively short time period for completion. On the other hand the machining operations performed at the remaining work stations require a time interval for completion which is about twice as long as the time interval required for completion of the machining operations at stations 1, 2, 11, 12 and 13. In view of this substantial difference in machining time required, stations 5 and 6 perform duplicate machining operations and stations 7 and 8 likewise perform duplicate machining operations. As pointed out previously stations 3, 4, 9 and 10 are idle stations at which no machining operation is performed.

To illustrate the manner in which the transfer mechanism of this invention operates let us assume a condition wherein a pallet 26 is located at each of the work stations 1, 2, 5, 6, 7, 8, 11, 12 and 13 and also at idle stations 9 and 10 and that there are no pallets at idle stations 3 and 4 and transfer bar 30 is in the retracted position while transfer bar 28 is in the advanced position (FIG. 1). Let us assume that a machining operation has just been completed at work stations 1, 2, 11, 12 and 13. The control mechanism in control panel 44 generates a signal indicating that transfer bar 30 should be advanced and actuates cylinder 70. Dogs 34 on bar 30 are thereby rotated to the engaged position and cylinder 38 is actuated to advance bar 30 through its stroke. Since there are no lugs on transfer bar 30 at stations 5, 6, 7 and 8, the only pallets that will be advanced are those located at stations 1, 2, 9, 10, 11, 12 and 13. As a result, a pallet-supported workpiece is moved from station 1 to station 2 and another pallet-supported workpiece is moved from station 2 to idle station 3. The pallet-supported workpieces at stations 9, 10, 11, 12 and 13 are advanced to the next successive stations; the pallet at station 13 being indexed to the unload station 16. It is understood, of course, that a pallet-supported workpiece is moved from the load station (not shown) to station 1. Thus, after bar 30 has advanced from the position shown in FIG. 1, the only stations at which there are no pallets are stations 4 and 9. While transfer bar 30 is advancing, transfer bar 28 is retracting with dogs 36 in the disengaged position.

After the transfer bar 30 has been advanced, cylinder 72 is actuated to rotate transfer bar 30 and pivot dogs 34 to the disengaged position shown in FIG. 10. Cylinder 38 is again actuated but in the opposite direction to retract transfer bar 30 to its starting poistion. Upon retraction of bar 30 transfer bar 28 is advanced; however, since no workpiece is located at station 4, the circuit control cylinder 70 will not be energized so the dogs 36 on bar 28 remain in the disengaged position while transfer bar 28 advances. A machining operation can then be performed at those work stations to which a pallet-supported workpiece has been advanced. During this interval of time the machining operations being performed at stations 5, 6, 7 and 8 merely continue. Then after the machining operations at all of the work stations have been completed, the control mechanism in control panel 44 generates the necessary signal to indicate that cylinder 38 can be again actuated.

On the next stroke of the cylinder 38 bar 30 is advanced with dogs 34 in the engaged position so that the pallets at stations 1, 2, 3, 10, 11, 12 and 13 advance to the next successive station. Dogs 34 on bar 30 are now disengaged. At this point there is a pallet located at all the stations except stations 9 and 10. Transfer bar 28 is at this time in the retracted position so that the dogs 36 shown in FIG. 1 as located at stations 5 and 6 are actually located at stations 3 and 4. Since the pallet-present switch 94 is actuated by the pallet at station 4, the signal produced at control panel 44 actuates cylinder 70 and rotates dogs 36 from the disengaged to the engaged position. Then when cylinder 38 is again actuated to retract transfer bar 30, transfer bar 28 is advanced through a distance corresponding to the stroke Y. When this occurs the pallet-supported workpieces at stations 7 and 8 are indexed to stations 9 and 10 respectively; the two pallet-supported workpieces at stations 5 and 6 are indexed to stations 7 and 8 respectively; and the two pallet-supported workpieces at stations 3 and 4 are indexed to stations 5 and 6 respectively.

It will thus be apparent that the workpieces at stations 5 and 6 and the workpieces at stations 7 and 8 can be subjected to machining operations which require at least twice the time interval as that required by the machining operations at the other work stations. However, by arranging the machine tools 12 so that identical operations are performed at stations 5 and 6 and other identical operations are performed at stations 7 and 8, a finished workpiece is discharged from station 13 upon each complete cycle of cylinder 38.

The arrangement shown and described is designed to accommodate at least one machining operation that requires about twice as much time as another machining operation on the automated line. It will be apparent that if one of the machining operations requires a time interval about three times as long as another machining operation, the arrangement described would be modified to the extent of providing three idle stations instead of two at the accumulating section and the separating section of the line and increasing the stroke of transfer bar 28 to three times the stroke of transfer bar 30 instead of twice the stroke. In addition, the control means would be modified to actuate cylinder 70 on every third stroke of transfer bar 28 rather than every second stroke thereof.

Although not illustrated in the drawings, a clamping mechanism is provided at each station for rigidly clamping each pallet-supported workpiece in rigidly fixed, accurately located position on rails 20, 22 between successive strokes of the transfer bars. Such clamping mechanism, while essential, forms no part of the present invention.

Thus it will be seen that by means of the present invention all of the transfer operations required can be performed by two transfer bars which reciprocate simultaneously in opposite directions. Furthermore, both transfer bars can be operated from a single motor. It will be appreciated that since the workpieces are advanced in two groups, one group when the piston rod 40 is actuated in one direction and the other group when rod 40 is actuated in the opposite direction, the power required for transfer is substantially less than would be necessary if all the workpieces were transferred simultaneously.

I claim:

1. A workpiece transfer mechanism comprising a series of stations divided into at least three groups, the first group of stations comprising at least one station at which workpieces are adapted to remain for a predetermined unit of time, the second group of stations comprising a series of stations at which the workpieces are adapted to remain at each station therein for a period of time equal to a multiple (greater than 1) of said unit of time, the number of stations in said second group being equal to said multiple, the third group of stations comprising a plurality of stations equal in number to said multiple, said third group of stations being located immediately between said first and second group, means at each station of the first and second group for performing an operation on the workpieces at said stations, the second group of stations comprising idle stations, a pair of reciprocal transfer members extending along said groups of stations, each transfer member having means thereon actuatable to engage workpieces at the stations to advance them to successive stations, means for reciprocating the two transfer members simultaneously in opposite directions and such that the stroke of one transfer member is equal to said multiple of the stroke of the other transfer member, means associated with said other transfer member for advancing workpieces upon each stroke thereof in the work advancing direction, means associated with said one transfer member for advancing workpieces upon each stroke thereof in the work advancing direction which is said multiple of the stroke of the other transfer member, said one transfer member being adapted to advance workpieces between the second and third group of stations and the other transfer member being adapted to transfer workpieces between the first and third group of stations.

2. The combination called for in claim 1 wherein said transfer members comprise a pair of transfer bars extending longitudinally along said groups of stations.

3. The combination called for in claim 2 wherein said work advancing means associated with each transfer bar comprise a plurality of dogs on the transfer bars and means for actuating the dogs to work engaging and work by-passing positions.

4. The combination called for in claim 3 wherein said one transfer bar is characterized by the presence of said dogs at each station of the second and third group and by the absence of dogs at the stations of the first group when the transfer bar is at one end of its stroke and the other transfer bar is characterized by the presence of said dogs at the stations of the first and third group and by the absence of dogs at the stations of the second group when said other transfer bar is at the opposite end of its stroke.

5. The combination called for in claim 3 wherein said dogs are fixed on the transfer bars and said means for actuating the dogs comprise means for rotating the transfer bars about their longitudinal axes.

6. The combination called for in claim 5 wherein said means for rotating said one transfer bar to position the dogs thereon in the work engaging position includes a means for detecting the presence of a workpiece at the last station of the third group.

7. The combination called for in claim 5 wherein said means for rotating said transfer bars comprise means for rotating said other transfer bar to position the dogs thereon in work engaging position upon each forward stroke thereof and means for rotating the one transfer bar to position the dogs thereon in work engaging position upon each forward stroke thereof when a workpiece is located at the last station of the third group.

8. The combination called for in claim 1 wherein said means for reciprocating said transfer members comprises a motor having a driving connection with one transfer member and means forming a driving connection between the two transfer members.

9. The combination called for in claim 8 wherein the interconnecting drive means between the two transfer members comprises a gear rack portion on each transfer member and a gear train interconnecting said gear rack portions.

10. The combination called for in claim 9 wherein said transfer members comprise a pair of parallel transfer bars and said motor has a driving connection with the forward end of one of said transfer bars.

11. In an apparatus for transferring workpieces along a series of successive stations located along a regular path the combination of work support means extending along said path for permitting workpieces supported thereon to be moved to successive stations along said path, a pair of reciprocal transfer members extending parallel to said path and adapted to advance workpieces when operatively actuated in the work advancing direction, means for reciprocating one of said transfer members through a predetermined stroke, means for reciprocating the other transfer member through a stroke which is a multiple (greater than 1) of the stroke of said one transfer member, said reciprocating means being adapted to reciprocate said transfer members simultaneously in opposite directions, means for actuating said one transfer member to advance workpieces through its stroke at regular time intervals and means for actuating the other transfer member to advance workpieces through its stroke at intervals which are said multiple of said regular time interval.

12. The combination set forth in claim 11 wherein said series of stations comprise a first group having at least one station at which workpieces are adapted to remain for said regular time interval, a second group of stations equal in number to said multiple and at each station of which workpieces are adapted to remain for a period of time equal to said multiple of said regular time interval, a third group of stations located immediately between said first and second group and being equal in number to said multiple, said one transfer member being adapted to advance workpieces one at a time through and between the stations of the first and third groups, said other transfer member being adapted to advance workpieces between the stations of said third and second groups of said multiple.

13. The combination called for in claim 11 wherein said multiple is two.

14. The combination called for in claim 12 wherein said groups of stations are arranged successively in the work advancing direction in the following order: first, third and second.

15. The combination called for in claim 12 including means at the stations of the first and second group for performing operations on the workpieces at said stations, the stations of the third group comprising idle stations.

16. The combination called for in claim 12 wherein said transfer members comprise a pair of transfer bars extending longitudinally along said groups of stations, each of said transfer bars having means thereon adapted to be actuated between a work engaging and work bypassing position and means for actuating said work engaging means to the work engaging position on the transfer bar adapted to transfer workpieces between the stations of the third and second groups on each stroke thereof which is a multiple of the stroke of the other transfer bar.

17. The combination called for in claim 11 wherein said groups are arranged successively in the work advancing direction in the following sequence: first, third and second and including a fourth group of stations next succeeding the second group, the number of stations in said fourth group being a multiple of the stations in the second group.

18. The combination called for in claim 11 wherein said means for reciprocating the two transfer members comprises a motor having a driving connection with one of the transfer members and drive means interconnecting the two transfer members for movement in unison in opposite directions and through different strokes.

19. In an apparatus for transferring workpieces along a series of successive stations located along a regular path the combination of work support means extending along said path for permitting workpieces supported thereon to be moved in one direction to successive stations along said path, a pair of reciprocal transfer bars extending parallel to said path and adapted to advance workpieces when operatively actuated in the work advancing direction, means for reciprocating one of said transfer bars through a predetermined stroke, means for reciprocating the other transfer bar through a stroke having a length which is a multiple (greater than 1) of the stroke of said one transfer bar, said reciprocating means being adapted to reciprocate said transfer bars simultaneously in opposite directions, means for actuating said one transfer bar to advance workpieces in said direction through its stroke at regular time intervals, means for actuating the other transfer bar to advance workpieces in said direction through its stroke at intervals which are said multiple of said regular time interval, said series of stations comprising a first group having at least one station at which workpieces are adapted to remain for said regular time interval, a second group of stations next successive to the first group and being equal in number to said multiple, a third group of stations next successive to the second and being equal in number to a multiple of the number of stations in the second group, a fourth group of stations next successive to the third and equal in number to the number of stations in the second group and a fifth group of stations next successive to the fourth, said one transfer bar being adapted to advance workpieces from the stations of the first group to and through each station of the second group one at a time and through the stations of the fourth group and to the stations of the fifth group one at a time, said second transfer bar being adapted to transfer workpieces from the stations of the second group into the third group and through the third group in a number equal to said first-mentioned multiple and from the stations of said third group into the fourth group in a number equal to said first-mentioned multiple.

20. The combination called for in claim 19 wherein said means for reciprocating the two transfer bars comprises a motor connected to one of said transfer bars, each transfer bar having a rack portion thereon and a gear train interconnecting the two work rack portions such that the two transfer bars move in unison in opposite directions and through different strokes.

References Cited

UNITED STATES PATENTS 3,062,353   11/1962   Opperthauser _____ 198—19

EDWARD A. SROKA, Primary Examiner.

U.S. Cl. X.R.

198—221